United States Patent
Kuwabara et al.

(10) Patent No.: US 7,116,026 B2
(45) Date of Patent: Oct. 3, 2006

(54) ADHESION STRUCTURE FOR MOTOR, HAVING THICKNESS DETERMINING MEANS

(75) Inventors: Hirofumi Kuwabara, Kariya (JP); Atsushi Hase, Okazaki (JP); Yasuo Kinoshita, Aichi-ken (JP)

(73) Assignee: Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 10/724,831

(22) Filed: Dec. 2, 2003

(65) Prior Publication Data

US 2004/0217664 A1 Nov. 4, 2004

(30) Foreign Application Priority Data

Dec. 3, 2002 (JP) .............................. 2002-351754

(51) Int. Cl.
H02K 1/27 (2006.01)

(52) U.S. Cl. .............................. 310/156.21; 310/154.07

(58) Field of Classification Search ........... 310/156.21, 310/156.38, 154.07, 154.21, 43; 29/596, 29/598

See application file for complete search history.

(56) References Cited

U.S. PATENT DOCUMENTS

| | | | | |
|---|---|---|---|---|
| 4,155,021 A | * | 5/1979 | Corbach et al. | 310/154.08 |
| 5,734,216 A | * | 3/1998 | Yamada et al. | 310/156.21 |
| 5,939,809 A | * | 8/1999 | Mobius | 310/156.28 |
| 6,324,745 B1 | | 12/2001 | Poag et al. | 29/598 |
| 2002/0135252 A1 | * | 9/2002 | Burton | 310/156.12 |
| 2004/0217664 A1 | * | 11/2004 | Kuwabara et al. | 310/156.21 |

FOREIGN PATENT DOCUMENTS

| | | | |
|---|---|---|---|
| JP | 60-102854 | | 6/1985 |
| JP | 62-193540 | * | 8/1987 |
| JP | 07-107687 | | 4/1995 |
| JP | 07-322576 | * | 12/1995 |
| JP | 09-140077 | * | 5/1997 |
| JP | 10-174318 | * | 6/1998 |
| JP | 11-89141 | | 3/1999 |
| JP | 2002-234449 | | 8/2002 |
| JP | 2004187411 | * | 7/2004 |
| WO | 00/14859 | * | 3/2000 |

* cited by examiner

Primary Examiner—Karl Tamai
(74) Attorney, Agent, or Firm—Oblon, Spivak, McClelland, Maier & Neustadt, P.C.

(57) ABSTRACT

An adhesion structure of a motor that adheres a rotor having a first linear expansion coefficient and a magnet having a second linear expansion coefficient, which differs from the first linear expansion coefficient, with an adhesive agent. The adhesion structure includes a thickness determining groove extending parallel to the axis of the rotor and arranged on the rotor in order to determine the thickness of an adhesive agent layer, which is formed from the adhesive agent. The thickness determining groove absorbs shearing stress produced by the difference between the first and second linear expansion coefficients at a surface adhered to the magnet. This effectively suppresses exfoliation of the adhesive agent layer.

13 Claims, 6 Drawing Sheets

ADHESION STRUCTURE FOR MOTOR, HAVING THICKNESS DETERMINING MEANS

CROSS-REFERENCE TO RELATED APPLICATIONS

This application is based upon and claims the benefit of priority from prior Japanese Patent Application No. 2002-351754, filed on Dec. 3, 2002, the entire contents of which are incorporated herein by reference.

BACKGROUND OF THE INVENTION

The present invention relates to an adhesion structure for a motor, and more particularly, to an adhesion structure that adheres a magnet and a rotor with an adhesive agent.

In the prior art, a brushless DC motor is used in an electric power steering apparatus. The DC motor includes an adhesion structure that adheres a magnet formed from neodymium, which is a rare earth, to the outer surface of a steel rotor with an adhesive agent.

The thickness of the adhesive agent between the rotor and the neodymium magnet is about 0.03 mm. The neodymium magnet has a linear expansion coefficient of about zero, which is less than that of the steel rotor. The adhesive agent has a linear expansion coefficient that is greater than that of the rotor.

A motor used in an automobile must be capable of withstanding temperatures of a wide range so that the motor can be used under any temperature that the automobile would encounter. In other words, the motor must function normally even when the automobile is driven in arctic or tropical regions. The adhesion structure undergoes performance tests by repeatedly changing the temperature in a range of, for example, minus 40° C. to positive 120° C. to confirm that the motor has the required durability under various temperatures or in environments in which the temperature changes significantly.

In the performance tests, the expansion and contraction of the neodymium magnet is subtle when the temperature changes. However, a change in temperature expands and contracts the rotor and the adhesive agent. As a result, shearing stress is applied to the interface (adhering surface) between the neodymium magnet and the solidified adhesive agent layer. This may lead to exfoliation of the adhesive agent layer.

Accordingly, Japanese Laid-Open Patent Publication No. 60-102854 proposes the application of a resin mold around the neodymium magnet after the neodymium magnet is adhered to the rotor with an adhesive agent. However, the processing of the resin mold takes time and increases the manufacturing cost.

Further, Japanese Laid-Open Patent Publication Nos. 11-89141 and 14-234449 describes filling a groove in a rotor with an adhesive agent to minimize exfoliation. However, exfoliation of the adhesive agent layer may still occur even when using the groove.

It is an object of the present invention to provide an adhesion structure that effectively suppresses exfoliation of an adhesive agent layer.

SUMMARY OF THE INVENTION

One aspect of the present invention is an adhesion structure for a motor for adhering a rotor or a stator having a first linear expansion coefficient and a magnet having a second linear expansion coefficient, which differs from the first linear expansion coefficient, to one another. The adhesion structure includes an adhesive agent for forming an adhesive agent layer. A thickness determining means extends in an axial direction of the rotor and is arranged on either one of the magnet and the rotor or the stator. The thickness determining means determines the thickness of the adhesive agent layer formed from the adhesive agent so as to absorb shearing stress produced by the difference between the first and second linear expansion coefficients at a surface adhered to the magnet.

A further aspect of the present invention is a motor including a rotor having a first linear expansion coefficient. A magnet is adhered to the rotor by an adhesive agent forming an adhesive agent layer. The magnet has a second linear expansion coefficient that differs from the first linear expansion coefficient. A thickness determining means extends in an axial direction of the rotor and is arranged on either one of the rotor or the magnet. The thickness determining means determines the thickness of the adhesive agent layer formed from the adhesive agent so as to absorb shearing stress produced by the difference between the first and second linear expansion coefficients at a surface adhered to the magnet.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
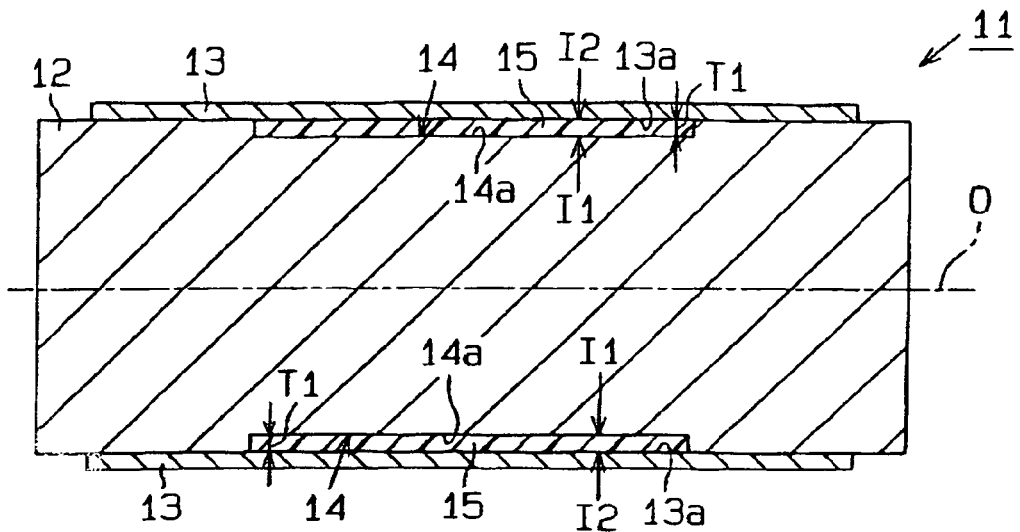
FIG. 1 is a cross-sectional view showing an adhesion structure according to a first embodiment of the present invention.

In the drawings, like numerals are used for like elements throughout.

An adhesion structure 11 according to a first embodiment of the present invention will now be discussed with reference to FIGS. 1 to 5.

Figure 2:
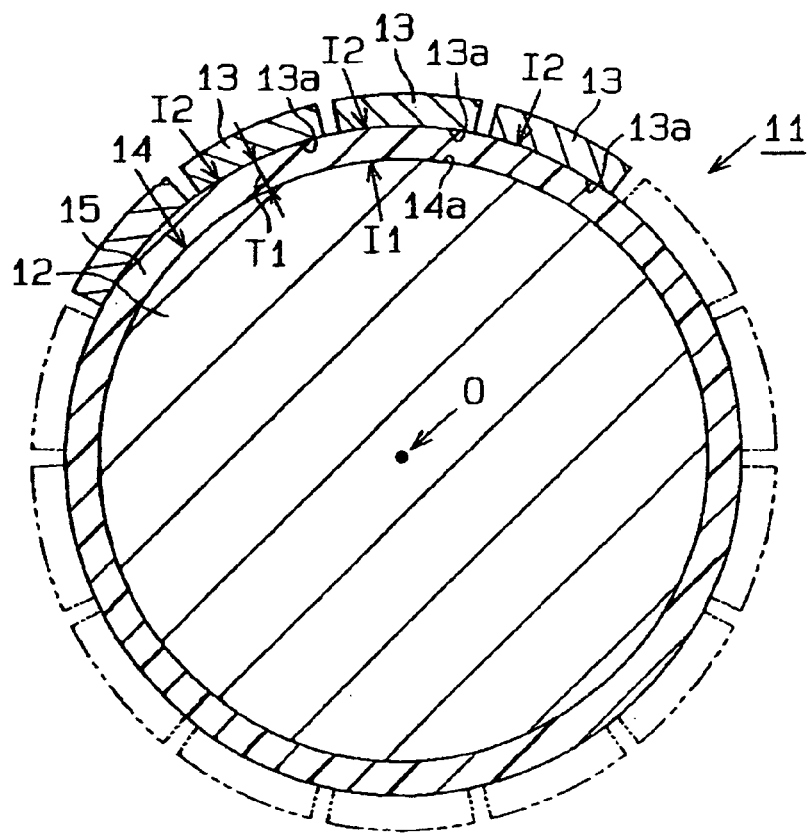
FIG. 2 is a front cross-sectional view of the adhesion structure of FIG. 1.

As shown in FIGS. 1 and 2, in the first embodiment, the adhesion structure 11 includes a steel rotor shaft 12 and a magnet 13 formed from neodymium, which is a rare earth. The rotor shaft 12 is used as a shaft of an inner rotor type brushless DC motor.

The rotor shaft 12 is cylindrical and has a predetermined diameter. A total of fourteen equally spaced neodymium magnets 13 are arranged along the outer surface of the rotor shaft 12. Each neodymium magnet 13 extends in the axial direction of the shaft 12 and has an arcuate cross-section. In each neodymium magnet 13, the surface opposed to the rotor shaft 12 (hereafter referred to as opposing surface 13a) is curved in the same manner as the outer surface of the rotor shaft 12. In other words, the opposing surface 13a of the neodymium magnet 13 has a radius of curvature that is equal to the radius of the rotor shaft 12.

An adhesive agent groove 14 extends around the entire outer surface of the axially central portion of the rotor shaft 12. The adhesive agent groove 14 has a uniform depth. Further, the adhesive agent groove 14 has a bottom surface 14a that defines a cylindrical surface, which is concentric to the outer surface of the rotor shaft 12 and which has a circumference that is shorter than that of the outer surface of the rotor shaft 12.

The adhesive agent groove 14 is filled with an adhesive agent. The adhesive agent is solidified to form an adhesive agent layer 15 that adheres the bottom surface 14a of the adhesive agent groove 14 to the opposing surface 13a of the neodymium magnet 13. The adhesive agent may be a general-purpose adhesive agent. It is preferred that the adhesive agent be an epoxy resin that is heat resistant (or an acrylic resin that is heat resistant). The adhesive agent is slightly elastic.

In the following description, the bottom surface 14a of the adhesive agent groove 14 and the adhering surface of the adhesive agent layer 15 is referred to as an interface I1, and the opposing surface 13a of the neodymium magnet 13 and the adhering surface of the adhesive agent layer 15 is referred to as an interface I2.

Since the opposing surface 13a of each neodymium magnet 13 and the outer surface of the rotor shaft 12 are curved in the same manner, every section of the adhesive agent of the adhesive agent groove 14 has the same thickness.

The linear expansion coefficient of the neodymium magnet 13 is substantially zero. The substance of the adhesive agent is selected so that the linear expansion coefficient increases in the order of the neodymium magnet 13, the rotor shaft 12, and the adhesive agent layer 15.

The adhesive agent groove 14 extends parallel to the axis O of the rotor shaft 12, that is, in the axial direction of the rotor shaft 12. The dimension of the adhesive agent groove 14 in the axial direction of the rotor shaft 12 is about half the dimension of the neodymium magnets 13 in the same direction, as viewed in FIG. 1. In the first embodiment, each neodymium magnet 13 has a length of 61.5 mm, an arcuate width of 7.9 mm, and a thickness of 2.5 mm. The width of the adhesive agent groove 14 is 35 mm. In this case, in each neodymium magnet 13, about 57% of the opposing surface 13a is adhered to the adhesive agent layer 15.

The width of the adhesive agent groove 14 may be selected from a range of 30 mm to 40 mm. However, it is preferred that the width be selected from a range of 33 mm to 37 mm. In other words, about 48% to 65%, preferably, about 54% to 60% of the opposing surface 13a of each neodymium magnet 13 is adhered to the adhesive agent layer 15. When the width of the adhesive agent groove 14 is 30 mm or less, the adhesive strength becomes insufficient and thus impractical. When the width of the adhesive agent groove 14 exceeds 40 mm, the adhesive strength remains the same. Thus, the amount of unnecessary adhesive agent used for the adhesion structure 11 increases and raises costs. Further, when the width of the adhesive agent groove 14 exceeds 40 mm, that is, when the axial lengths of the interfaces I1 and I2 exceeds 40 mm, shearing stress applied to the ends of the interfaces I1 and I2 in the axial direction becomes greater than the shearing stress applied to the axially central portions of the interfaces I1 and I2. As a result, exfoliation tends to occur. The tendency of exfoliation increases as the axial lengths of the interfaces I1 and I2 increase.

In the first embodiment, the depth of the adhesive agent groove 14 is 0.1 mm. In other words, the adhesive agent layer 15 has a thickness of 0.1 mm. In other words, the adhesive agent layer 15 is formed to have a thickness selected from the range of 0.05 to 0.2 mm in 100% of the adhesive agent layer 15. That is, the adhesive agent layer 15 may have a uniform thickness selected from the range of 0.05 to 0.2 mm. The axially central portion of the opposing surface 13a in each neodymium magnet 13 is adhered by the adhesive agent and the axially end portions of the opposing surface 13a are not adhered by the adhesive agent. These not adhered end portions are in contact with the outer surface of the rotor shaft 12. Accordingly, the axially end portions of each of the magnets 13 are in a free condition where the axially end portions are not adhered to the rotor shaft 12.

The depth of the adhesive agent groove 14 is preferably selected from a range of 0.05 to 0.2 mm, more preferably selected from a range of 0.075 to 0.175 mm, and most preferably selected from a range of 0.1 to 0.150 mm.

When the depth of the adhesive agent groove 14 is less than 0.05 mm, the thickness T1 of the adhesive agent layer 15 is also less than 0.05 mm in correspondence with the depth of the adhesive agent groove 14. In such a case, the elasticity of the adhesive agent layer 15 becomes insufficient for absorbing the shearing stress applied to the interfaces I1 and I2. When the depth of the adhesive agent groove 14 exceeds 0.2 mm, the thickness T1 of the adhesive agent layer 15 also exceeds 0.2 mm in correspondence with the depth of the adhesive agent groove 14. This decreases the adhesive strength and causes the adhesive agent layer 15 to become impractical. To facilitate understanding, the depth of the adhesive agent groove 14 is shown exaggerated from the actual state in the drawings.

The adhesive strength of the adhesion structure 11 will now be discussed with reference to comparison tests conducted on three samples A1, A2, and A3.

Figure 3:
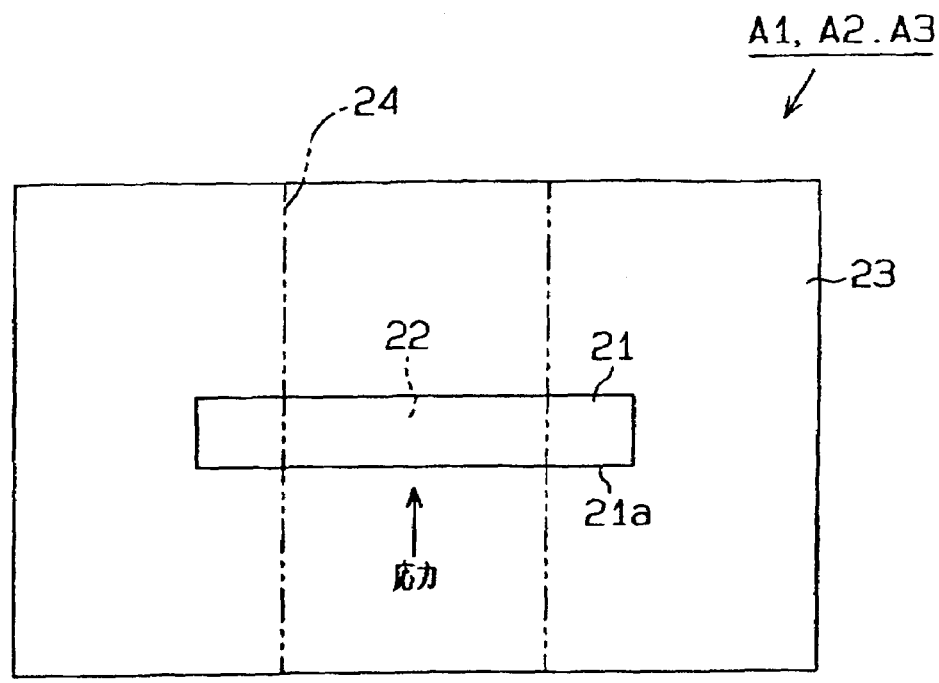
FIG. 3 is a plan view showing a sample of the adhesion structure of FIG. 1.

Referring to FIG. 3, the samples A1, A2, and A3 were respectively block-like neodymium magnets 21 (61.5 mm (length)×7.9 mm (width)×2.5 mm (thickness)) and adhered to a steel plate 23 by adhesive agents (adhesive agent layer 22) having different layer thicknesses. The adhering area between the steel plate 23 and the neodymium magnet 21 of each sample A1, A2, and A3 corresponds to the area of a longitudinally middle portion of the neodymium magnet 21 (35 mm×7.9 mm).

For sample A1, the neodymium magnet 21 and the steel plate 23 having no grooves are adhered by the adhesive agent, i.e., the adhesive agent layer 22 having a thickness of 0.03 mm.

For samples A2 and A3, an adhesive agent groove 24 (shown by the broken lines in FIG. 3) having a width of 35 mm and a depth that is uniform was formed in the steel plate 23. The adhesive agent groove 24 was filled with the adhesive agent (adhesive agent layer 22) to adhere the neodymium magnet to the steel plate 23. The depth of the adhesive agent groove 24 was 0.1 mm for the sample A2 and 0.2 mm for the sample A3. Accordingly, the adhesive agent layer 22 of the sample A2 had a thickness 0.1 mm, and the adhesive agent layer 22 of the sample A3 had a thickness of 0.2 mm.

The sample A1 corresponded to the adhesion structure of the prior art, and the sample A2 corresponded to the adhesion structure of the first embodiment.

Figure 4:
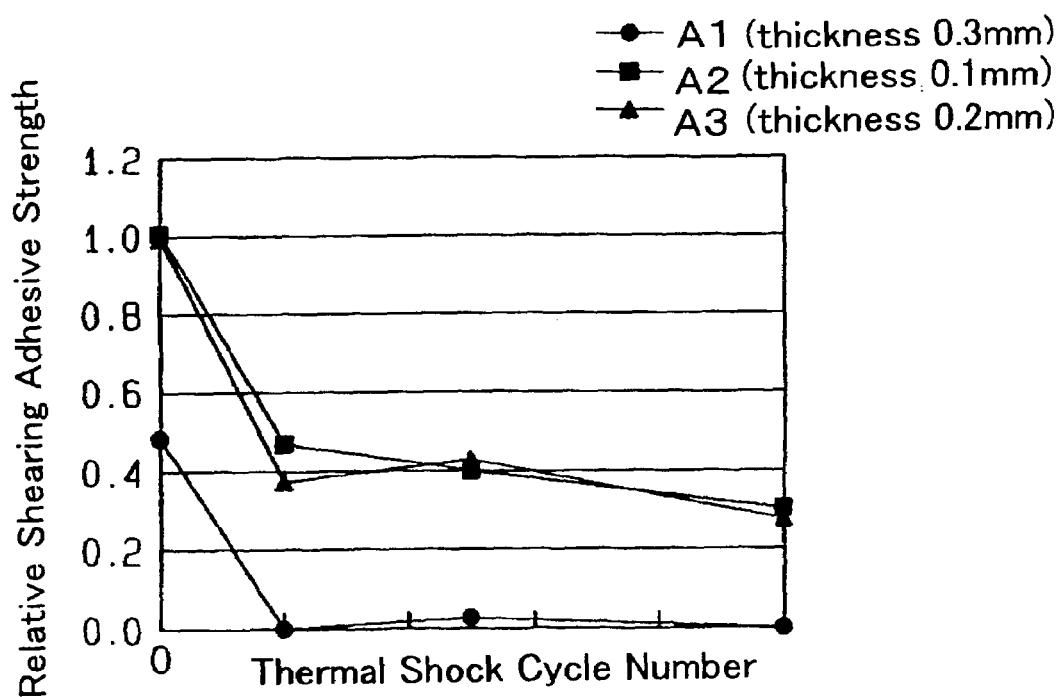
FIG. 4 is a graph showing the relationship between the thermal shock cycle number and the relative shearing adhesive strength of different samples.

FIG. 4 is a graph showing the relationship between the thermal shock cycle number (horizontal axis) and the relative shearing adhesive strength (vertical axis) in the samples A1, A2, and A3. The term "thermal shock cycle number" refers to the number of times a thermal shock test, in which the temperature was changed in a range of −40° C. to 120° C., was repeated. Further, the term "relative shearing adhesive strength" refers to the ratio of the initial shearing adhesive strength during repetition of the thermal shock cycles and the shearing adhesive strength of each sample when the initial shearing adhesive strength of the sample A2 is defined as 1.

With reference to FIG. 3, for each of the samples A1, A2, and A3, stress was applied to a side surface 21a of the neodymium magnet 21 in a direction perpendicular to the longitudinal direction of the neodymium magnet 21 during the shearing adhesive strength test.

As apparent from FIG. 4, when the thermal shock cycle number is 0, the relative shearing adhesive strength of the samples A2 and A3 is about two times greater than that of the sample A1. As the thermal shock cycle number increases, the relative shearing adhesive strength of the sample A1 quickly decreases to 0, whereas the relative shearing adhesive strength shifts to a range of 0.2 to 0.5. Further, although not shown in FIG. 4, the same characteristics as the sample A2 was obtained when the thickness of the adhesive agent layer 22 was 0.05 mm.

Figure 5:
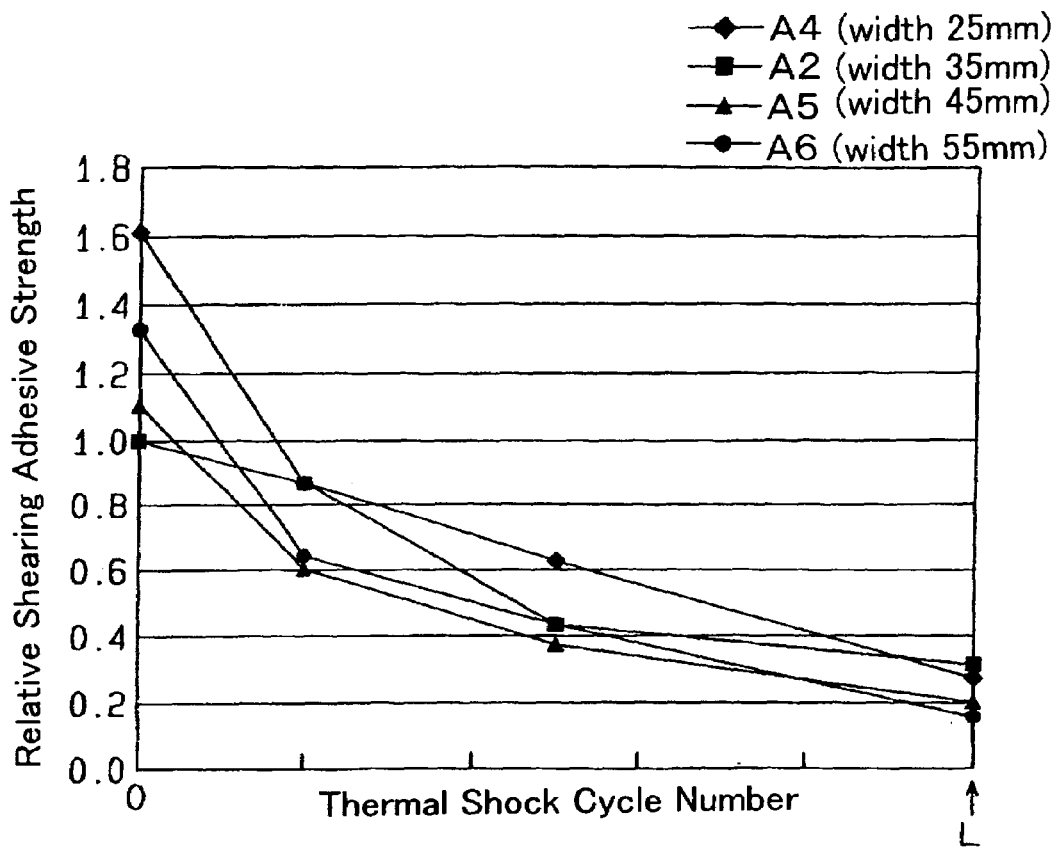
FIG. 5 is a graph showing the relationship between the thermal shock cycle number and the relative shearing adhesive strength of further samples.

FIG. 5 shows the results of comparing the sample A2 and samples A4, A5, and A6 having adhering areas that differ from that of the sample A2. The width of the adhesive agent groove 24 in the samples A4, A5, and A6 were 25 mm, 45 mm, and 55 mm, respectively. The adhering area of the sample A4 (groove width 25 mm) was 25 mm×7.9 mm, and the adhering area of the sample A5 (groove width 45 mm) was 45 mm×7.9 mm. Further, the adhering area of the sample A6 (groove width 55 mm) was 55 mm×7.9 mm.

In FIG. 5, the term "relative shearing adhesive strength" refers to the ratio of the initial shearing adhesive strength during repetition of the thermal shock cycles and the shearing adhesive strength of each sample when the initial shearing adhesive strength of the sample A2 is defined as 1.

The letter L in FIG. 5 indicates life cycle number with respect to the thermal shock cycle number. At the life cycle number L, the relative shearing adhesive strength was in the order of sample A2>sample A4>sample A5>sample A6.

More specifically, when comparing the sample A2 (groove width 35 mm) and the sample A4 (groove width 25 mm), the relative shearing adhesive strength of the sample A2 is greater than that of the sample A4. When comparing the sample A2 (groove width 35 mm), the sample A5 (groove width 45 mm), and the sample A6 (groove width 55 mm) with one another, the relative shearing adhesive strength decreases as the groove width increases.

Accordingly, among the samples A2, A4, A5, and A6, the sample A2 had the greatest relative shearing adhesive strength and obtained the optimal results.

As described above, the results of the comparison tests conducted on the samples A1, A2, A3, A4, A5, and A6 showed the same results obtained from the comparison test conducted on samples using the adhesion structure 11 of the first embodiment and the adhesion structure of the prior art.

The adhesion structure 11 of the first embodiment has the advantages described below.

(1) The adhesive agent groove 14, which determines the thickness T1 of the adhesive agent layer 15, is formed so that the adhesive agent layer 15 absorbs the shearing stress produced at the interfaces I1 and I2 due to the linear expansion difference between the rotor shaft 12 and the neodymium magnet 13. Accordingly, the adhesive agent groove 14 determines the thickness T1 of the adhesive agent layer 15, which absorbs the shearing stress applied to the adhesive agent layer 15. This effectively suppresses exfoliation of the adhesive agent layer 15.

A process for forming the adhesive agent groove 14 is necessary in the adhesion structure 11 of the first embodiment. This process is not necessary in the adhering structure of the prior art. However, the process is simpler than the process in which a resin mold is applied around the neodymium magnet 13. Accordingly, the adhesion structure 11 is formed more easily.

(2) The depth of the adhesive agent groove 14 is 0.1 mm. This enables the adhesive agent layer 15 to have elasticity that absorbs the shearing force applied to the interfaces I1 and I2 without decreasing the adhesive strength of the adhesive agent layer 15.

(3) The adhesive agent groove 14 is formed in the outer surface of the rotor shaft 12. The adhesive agent adheres the bottom surface 14a of the adhesive agent groove 14 to the neodymium magnets 13. Accordingly, the thickness T1 of the adhesive agent layer 15 is determined in accordance with the depth of the adhesive agent groove 14.

(4) The adhesive agent groove 14 extends along the entire circumference of the rotor shaft 12. Accordingly, the plurality of neodymium magnets 13 are adhered to the rotor shaft 12 by the single adhesive agent groove 14. Further, the adhesive agent groove 14 that extends along the entire circumference of the cylindrical rotor shaft 12 may easily be machined by a lathe.

(5) The opposing surface 13a of each neodymium magnet 13 and the outer surface of the rotor shaft 12 are curved in the same manner, and the bottom surface 14a of the adhesive agent groove 14 is concentric to the outer surface of the rotor shaft 12. Thus, every section of the adhesive agent layer 15 in the adhesive agent groove 14 has the same thickness. Accordingly, every section of the adhesive agent layer 15 has elasticity that absorbs the shearing force applied to the interfaces I1 and I2 without decreasing the adhesive strength. This adheres the rotor shaft 12 and the neodymium magnets 13 in a satisfactory state.

Generally, the linear expansion coefficient of a neodymium magnet is 0 to $0.6 \times 10^{-6}$ (planar direction) and the linear expansion coefficient of steel is $11 \times 10^{-6}$. Thus, the difference between the linear expansion coefficients is $11 \times 10^{-6}$ to $10.4 \times 10^{-6}$. Accordingly, by combining materials having a linear expansion coefficient difference that is about the same as the combination of steel and neodymium magnet, or a linear expansion coefficient difference of about $10.0 \times 10^{-6}$ or greater, the advantages of the first embodiment may be obtained.

Figure 6:
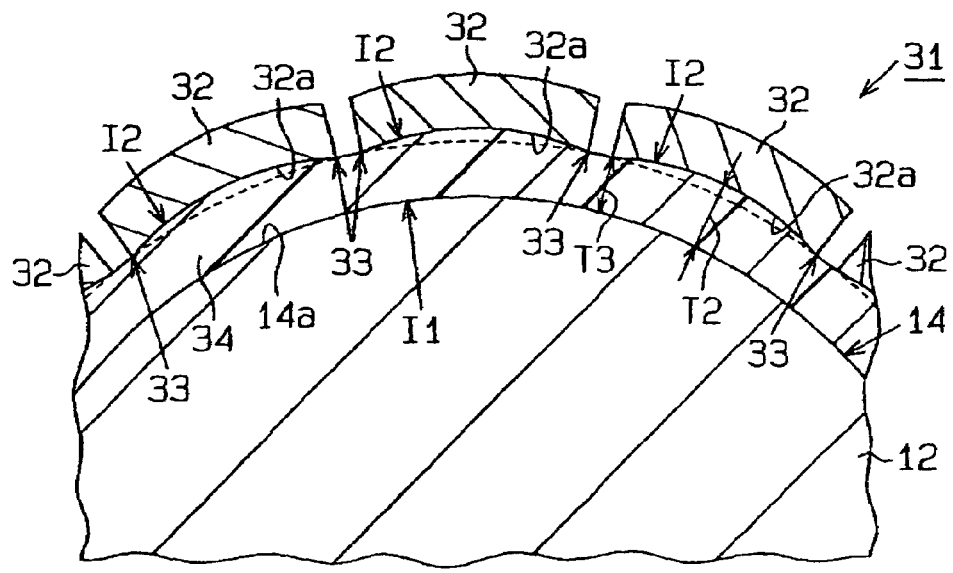
FIG. 6 is a front partial cross-sectional view of an adhesion structure according to a second embodiment of the present invention.

An adhesion structure 31 according to a second embodiment of the present invention will now be discussed with reference to FIG. 6. The adhesion structure 31 uses neodymium magnets 32 that are shaped differently from the neodymium magnets 13 used for the adhesion structure 11 of the first embodiment.

The adhesion structure 31 includes a plurality of the neodymium magnets 32. Each neodymium magnet 32 has a surface (hereafter referred to as opposing surface) 32a opposed to the rotor shaft 12. The radius of curvature of the opposing surface 32a is smaller than the radius of the rotor shaft 12. In each neodymium magnet 32, the lateral edges, or contact edges 33, of the opposing surface 32a contact the outer surface of the rotor shaft 12 at portions excluding where the adhesive agent layer is formed. That is, the contact edges 33 contact the outer surface of the rotor shaft 12 along the axial direction of the rotor shaft 12.

An adhesive agent adhering the neodymium magnets 32 to the outer surface of the rotor shaft 12 forms an adhesive agent layer 34. The adhesive agent layer 34 has a maximum thickness T2 at portions corresponding to the laterally central portion of each neodymium magnet 32. Further, the adhesive agent layer 34 has a minimum thickness T3 at portions corresponding to the contact edges 33 of each neodymium magnet 32. In the second embodiment, the thickness T2 is 0.2 mm or less, and the thickness T3 is 0.05 mm or more. More specifically, in the second embodiment, the depth of the adhesive agent groove 14 and the radius of curvature of the opposing surface 32a of the neodymium magnets 32 determine the thicknesses T2 and T3 of the adhesive agent layer 34.

In a state in which the two contact edges 33 of each neodymium magnet 32 contacts the outer surface of the rotor shaft 12, the neodymium magnet 32 is adhered to the rotor shaft 12 by an adhesive agent. In other words, both contact edges 33 of the neodymium magnet 32 always contact the rotor shaft 12. Thus, the neodymium magnet 32 is adhered to the rotor shaft 12 in a stable state.

In addition to advantages (1) and (4) of the adhesion structure 11 in the first embodiment, the adhesion structure 31 of the second embodiment has the advantages described below.

(1) The opposing surface 32a of each neodymium magnet 32 has a radius of curvature that is smaller than the radius of the rotor shaft 12. Thus, in a state in which the contact edges 33 of each neodymium magnet 32 contacts the outer surface of the rotor shaft 12, the neodymium magnets 32 are adhered to the rotor shaft 12 by an adhesive agent. This avoids a state in which only one of the contact edges 33 of the neodymium magnet 32 contacts the rotor shaft 12 and adheres the neodymium magnets 32 to the rotor shaft 12 in a stable state.

(2) The thicknesses T2 and T3 of the adhesive agent layer 34 is determined by the depth of the adhesive agent groove 14 and the radius of curvature of the opposing surface 32a in each neodymium magnet 32. Accordingly, the thicknesses T2 and T3 may be adjusted in an optimal manner.

It should be apparent to those skilled in the art that the present invention may be embodied in many other specific forms without departing from the spirit or scope of the invention. Particularly, it should be understood that the present invention may be embodied in the following forms.

Figure 7:
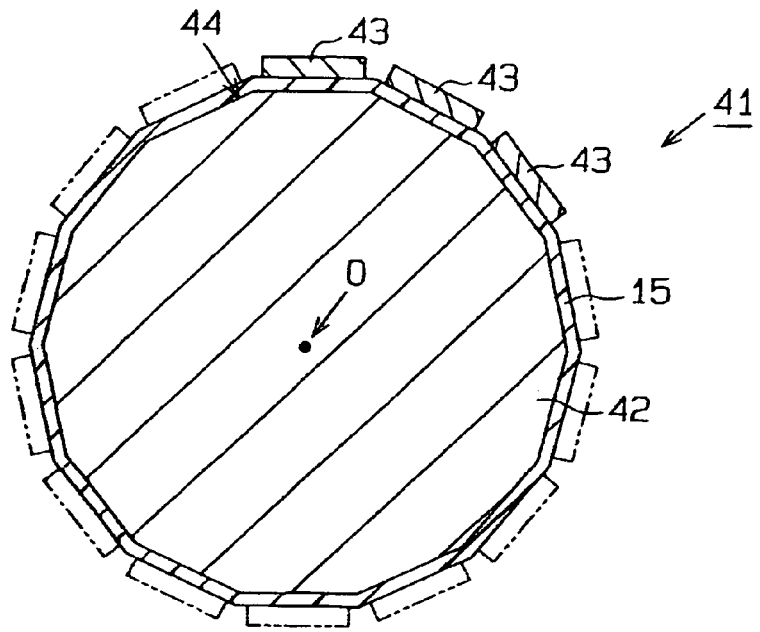
FIG. 7 is a front cross-sectional view showing a first modification of an adhesion structure according to the present invention.

Referring to FIG. 7, the present invention may be embodied in an adhesion structure 41 including a rotor shaft 42, which has a polygonal cross-section, and a block-like neodymium magnet 43. In this case, an adhesive agent groove 44 is formed in the outer surface of the rotor shaft 42. An adhesive agent is filled in the adhesive agent groove 44 to adhere the neodymium magnets 43 to the rotor shaft 42. The depth of the adhesive agent groove 44 determines the thickness of the adhesive agent layer.

Figure 8:
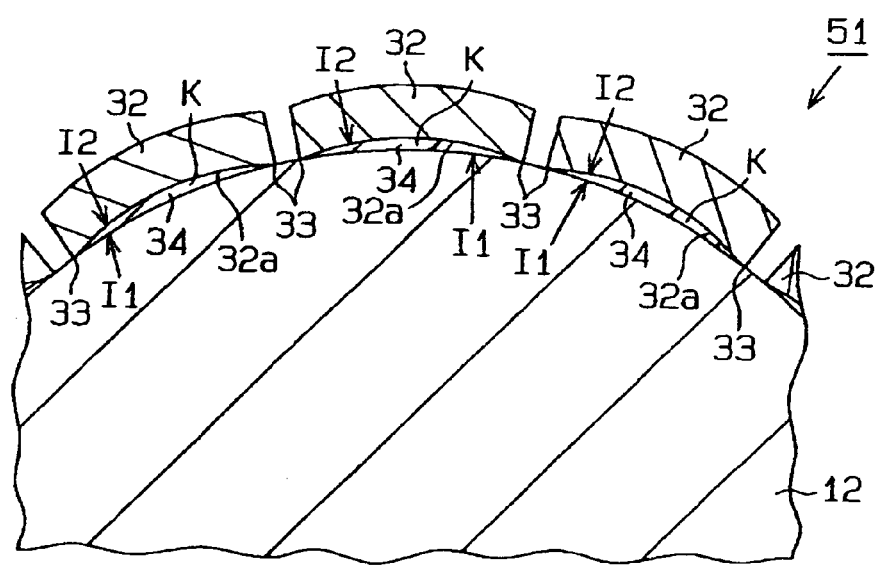
FIG. 8 is a front cross-sectional view showing a second modification of an adhesion structure according to the present invention.

In the second embodiment, the adhesive agent groove 14 of the rotor shaft 12 may be eliminated. More specifically, referring to FIG. 8 showing an adhesion structure 51, an adhesive agent is filled in a thickness determining gap formed between the opposing surface 32a of each neodymium magnet 32 and the outer surface of the rotor shaft 12 to adhere the rotor shaft 12 and the neodymium magnet 32. In this case, the radius of curvature of the opposing surface 32a determines the thickness of the adhesive agent layer 34. More specifically, the radius of curvature of the opposing surface 32a is determined so that 50% of more of the adhesive agent layer 34 has a thickness in the range of 0.05 mm to 0.2 mm.

Figure 9:
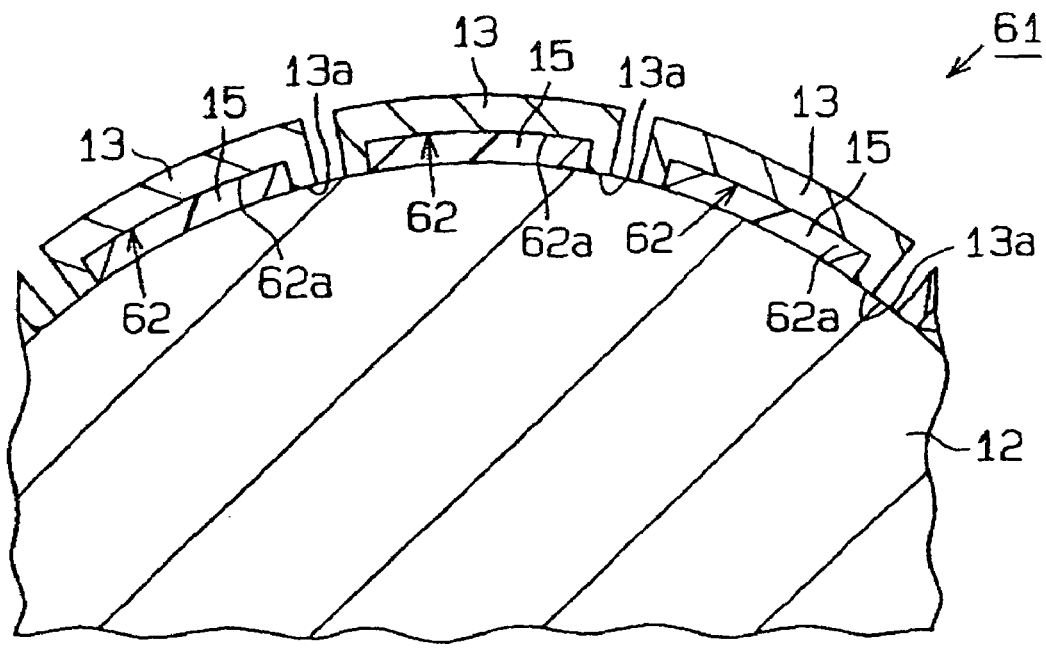
FIG. 9 is a front cross-sectional view showing a third modification of an adhesion structure according to the present invention.

In the first embodiment, the adhesive agent groove 14 may be eliminated. More specifically, referring to FIG. 9 showing an adhesion structure 61, an adhesive agent groove 62 is formed in the opposing surface 13a of each neodymium magnet 13 in the axial direction of the rotor shaft 12. An adhesive agent adheres a bottom surface 62a of the adhesive agent groove 62 and outer surface of the rotor shaft 12. In this case, the depth of the adhesive agent groove 62 determines the thickness of the adhesive agent layer.

Figure 10:
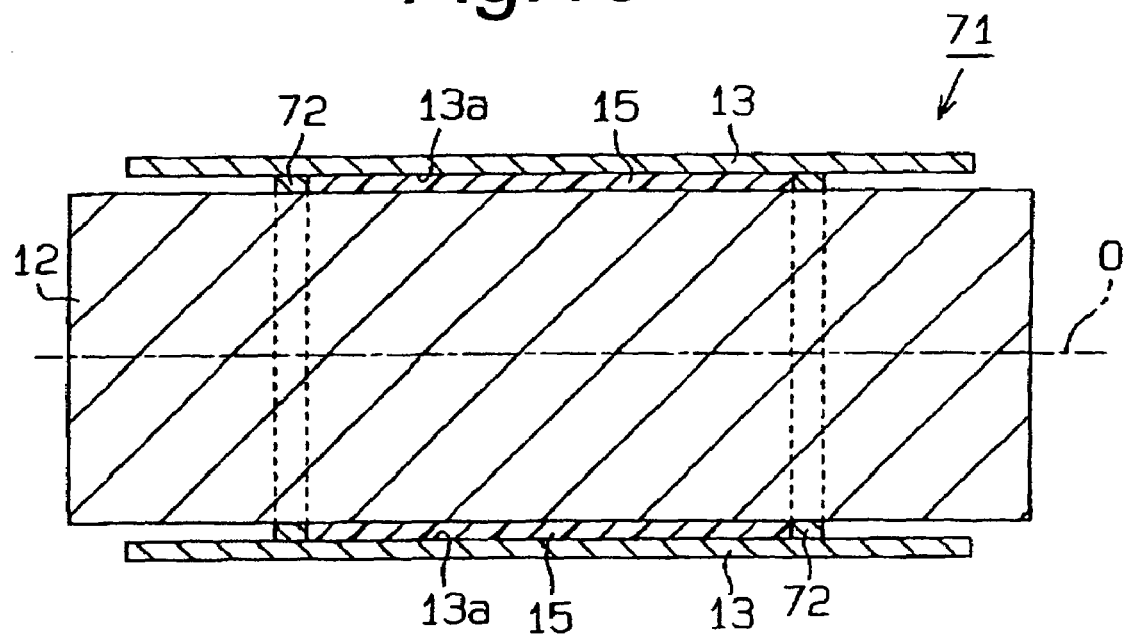
FIG. 10 is a side cross-sectional view showing a fourth modification of an adhesion structure according to the present invention.

Instead of the adhesive agent groove 14, the present invention may also be embodied in an adhesion structure 71 that includes spacers 72 as a thickness determining member as shown in FIG. 10. More specifically, a pair of spacers 72 may be used to determine the distance between the rotor shaft 12 and the neodymium magnets 13 and to determine the thickness of the adhesive agent layer. Each of the spacers 72 is annular and fitted to the outer surface of the rotor shaft 12. A wire or tape may also be used in lieu of each spacer 72.

Figure 11:
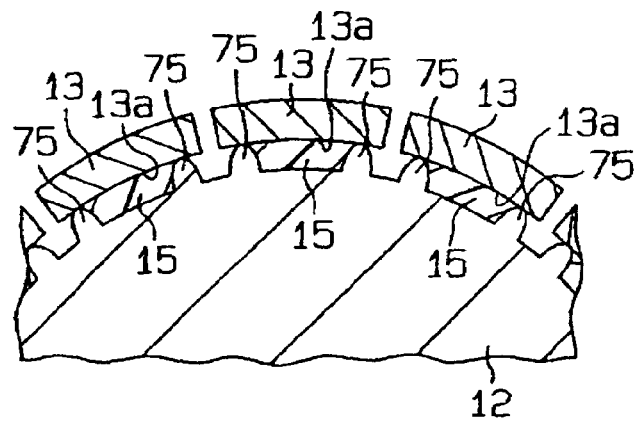
FIG. 11 is a front cross-sectional view showing a fifth modification of an adhesion structure according to the present invention.
Figure 12:
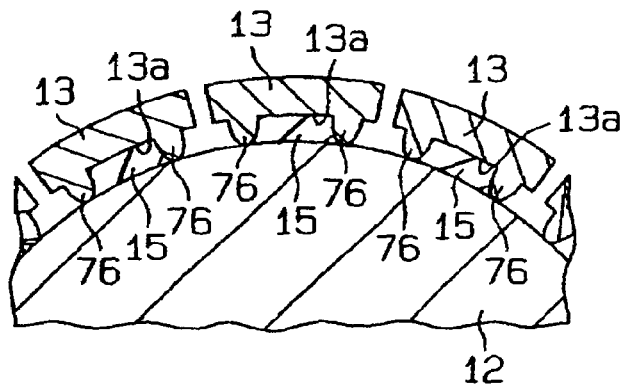
FIG. 12 is a front cross-sectional view showing a sixth modification of an adhesion structure according to the present invention.

Further, to determine the distance between the rotor shaft 12 and the neodymium magnets 13, thickness determining projections 75 may be formed on the outer surface of the rotor shaft 12 (FIG. 11). Alternately, thickness determining projections 76 may be formed on the opposing surface 13a of each neodymium magnet 13 (FIG. 12). The thickness determining projections 75 and 76 maintains the distance between the adhered rotor shaft 12 and neodymium magnets 13. In this case, the projecting lengths of the thickness determining projections 75 and 76 determine the thickness of the adhesive agent layer. The thickness determining projections 75 and 76 may be a plurality of bosses formed at predetermined intervals in the axial direction of the rotor shaft 2 or walls extending in the axial direction of the rotor shaft 12.

Figure 13:
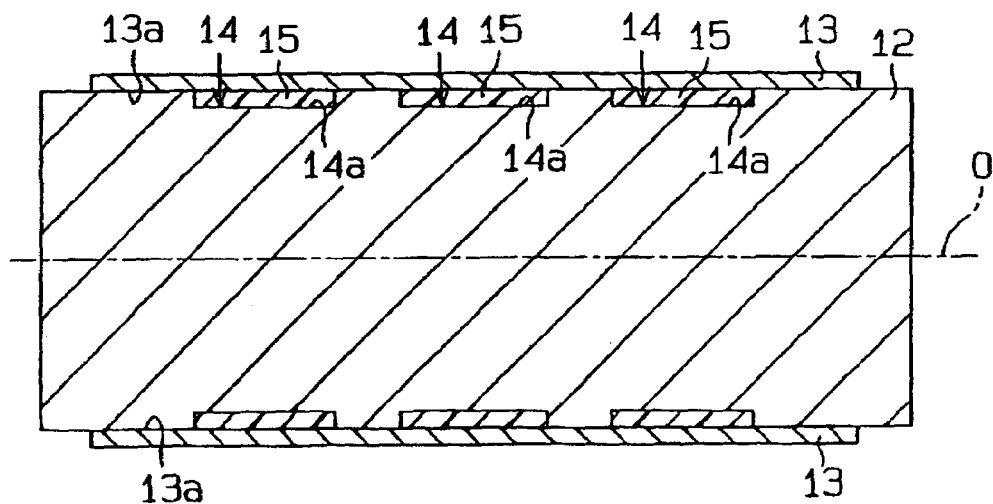
FIG. 13 is a side cross-sectional view showing a seventh modification of an adhesion structure according to the present invention.

Referring to FIG. 13, a plurality of adhesive agent grooves 14 may be formed in the rotor shaft 12 of the first embodiment at predetermined intervals in the axial direction. In this case, adhesive agent is filled in each of the adhesive agent grooves 14 to adhere the rotor shaft 12 and the neodymium magnets 13.

In the first and second embodiments, instead of forming the adhesive agent groove 14 along the entire circumference of the rotor shaft 12, the adhesive agent groove 14 may be formed only at portions in the outer surface of the rotor shaft 12 that are adhered with the opposing surfaces 13a of the neodymium magnets 13 by an adhesive agent.

As long as the materials of the rotor shaft 12 and the magnets 13 have different linear expansion coefficients, any material may be used to form the rotor shaft 12 and the neodymium magnets 13.

In the first and second embodiments, the adhesive agent groove 14 is formed in the rotor shaft 12 of the inner rotor type brushless DC motor, and the adhesive agent layer 15 adheres the rotor shaft 12 and the neodymium magnets 13. However, the present invention is not limited to such structure. For example, a thickness determining groove may be formed in an inner surface of a rotor for an outer rotor type brushless DC motor. In this case, the layer thickness determining groove is used to determine the thickness of the adhesive agent layer that adheres the neodymium magnets to the rotor. Alternatively, an outer rotor type brushless DC motor may have the thickness determining groove formed in neodymium magnets to determine the thickness of the adhesive agent layer and adhere the magnets to the rotor.

The present invention may be applied to an adhering structure that adheres neodymium magnets to the inner surface of a stator for a motor.

In the first embodiment, instead of forming the adhesive agent groove 14 in the outer surface of the rotor shaft 12, an adhesive agent groove may be formed in the inner surface of a stator. An adhesive agent is filled in the adhesive agent groove to adhere neodymium magnets to the stator.

The present examples and embodiments are to be considered as illustrative and not restrictive, and the invention is not to be limited to the details given herein, but may be modified within the scope and equivalence of the appended claims.

What is claimed is:

1. An adhesion structure for a motor for adhering a rotor or a stator having a first linear expansion coefficient to a plurality of magnets arranged circumferentially on the rotor or stator, said magnets having a second linear expansion coefficient, which differs from the first linear expansion coefficient, the adhesion structure comprising:
   a circumferentially continuous groove formed in a surface of one of said rotor and said stator to form a thickness determining means extending in an axial direction of the rotor; and
   an adhesive agent in the circumferentially continuous groove for forming an adhesive agent layer;
   wherein the thickness determining means determines the thickness of the adhesive agent layer formed from the adhesive agent so as to absorb shearing stress produced by the difference between the first and second linear thermal expansion coefficients at a surface adhered to the magnets,
   wherein the thickness determining means further includes:
   an opposing surface defined on a surface of each of the magnets opposed to the rotor or the stator and having a radius of curvature that is smaller than the radius of the rotor or the stator; and
   a gap defined between the rotor or the stator and the opposing surface of each of the magnets.

2. The adhesion structure according to claim 1, wherein the thickness of the adhesive agent layer determined by the thickness determining means is in the range of 0.05 mm to 0.2 mm.

3. The adhesion structure according to claim 2, wherein the thickness of the adhesive agent layer is 0.05 mm to 0.2 mm in 50% to 100% of the adhesive agent layer.

4. The adhesion structure according to claim 1, wherein the thickness of the adhesive agent layer determined by the thickness determining means is in the range of 0.075 mm to 0.175 mm.

5. The adhesion structure according to claim 1, wherein the thickness of the adhesive agent layer determined by the thickness determining means is in the range of 0.1 mm to 0.15 mm.

6. The adhesion structure according to claim 1, wherein the circumferentially continuous groove has a depth in the range of 0.05 mm to 0.2 mm.

7. The adhesion structure according to claim 1, wherein the circumferentially continuous groove has a depth in the range of 0.075 mm to 0.175 mm.

8. The adhesion structure according to claim 1, wherein the circumferentially continuous groove has a depth in the range of 0.1 mm to 0.15 mm.

9. The adhesion structure according to claim 1, wherein the difference between the first linear expansion coefficient and the second linear expansion coefficient is greater than $10.4 \times 10^{-6}$.

10. The adhesion structure according to claim 9, wherein the rotor or the stator is made of steel, and the magnets are made of a rare earth element material.

11. The adhesion structure according to claim 1, wherein the thickness determining means is arranged to correspond with 48% or more of a surface of the magnets opposed to the rotor or the stator in the axial direction of the rotor or the stator.

12. The adhesion structure according to claim 1, wherein 48% to 65% of a surface of each of the magnets opposed to the rotor or the stator is adhered to the rotor or the stator by the adhesive agent layer.

13. A motor comprising:
   a rotor having a first linear expansion coefficient;
   a plurality of magnets arranged circumferentially on the rotor, said magnets adhered to the rotor by an adhesive agent forming an adhesive agent layer, the magnets having a second linear expansion coefficient that differs from the first linear expansion coefficient; and
   a thickness determining means extending in an axial direction of the rotor and arranged on either one of the rotor or the magnets, the thickness determining means determining the thickness of the adhesive agent layer formed from the adhesive agent so as to absorb shearing stress produced by the difference between the first and second linear thermal expansion coefficients at a surface adhered to the magnets, and comprising a circumferentially continuous groove formed in a surface of one of said rotor and said stator, wherein the adhesive agent layer is provided in said groove, and wherein the thickness determining means further includes:
   an opposing surface defined on a surface of each of the magnets opposed to the rotor or the stator and having a radius of curvature that is smaller than the radius of the rotor or the stator; and
   a gap defined between the rotor or the stator and the opposing surface of each of the magnets.

* * * * *